(12) United States Patent
Jacobs

(10) Patent No.: US 8,412,018 B2
(45) Date of Patent: Apr. 2, 2013

(54) LARGE-AREA OPTICAL ELEMENT

(75) Inventor: Simon J. Jacobs, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1296 days.

(21) Appl. No.: 11/675,875

(22) Filed: Feb. 16, 2007

(65) Prior Publication Data

US 2007/0188877 A1 Aug. 16, 2007

Related U.S. Application Data

(60) Provisional application No. 60/773,991, filed on Feb. 16, 2006.

(51) Int. Cl.
*G02B 6/00* (2006.01)

(52) U.S. Cl. ........................................ 385/147; 362/318
(58) Field of Classification Search .................. None
See application file for complete search history.

(56) References Cited

U.S. PATENT DOCUMENTS

| | | | | |
|---|---|---|---|---|
| 5,796,892 | A * | 8/1998 | Karni et al. | 385/38 |
| 6,188,820 | B1 * | 2/2001 | Yogev | 385/43 |
| 6,655,810 | B2 * | 12/2003 | Hayashi et al. | 362/600 |
| 2006/0001037 | A1 * | 1/2006 | Schardt et al. | 257/98 |
| 2008/0123343 | A1 * | 5/2008 | Kobayashi et al. | 362/298 |

* cited by examiner

*Primary Examiner* — Sarah Hahm
(74) *Attorney, Agent, or Firm* — Warren L. Franz; Wade J. Brady, III; Frederick J. Telecky, Jr.

(57) ABSTRACT

A large-area optical element is described. The large-area optical element includes a monolithic container fabricated from a transparent material, wherein the monolithic container has a plurality of optical surfaces. A liquid is positioned within the monolithic container, wherein the liquid has a density substantially less than a density of the monolithic container.

8 Claims, 3 Drawing Sheets

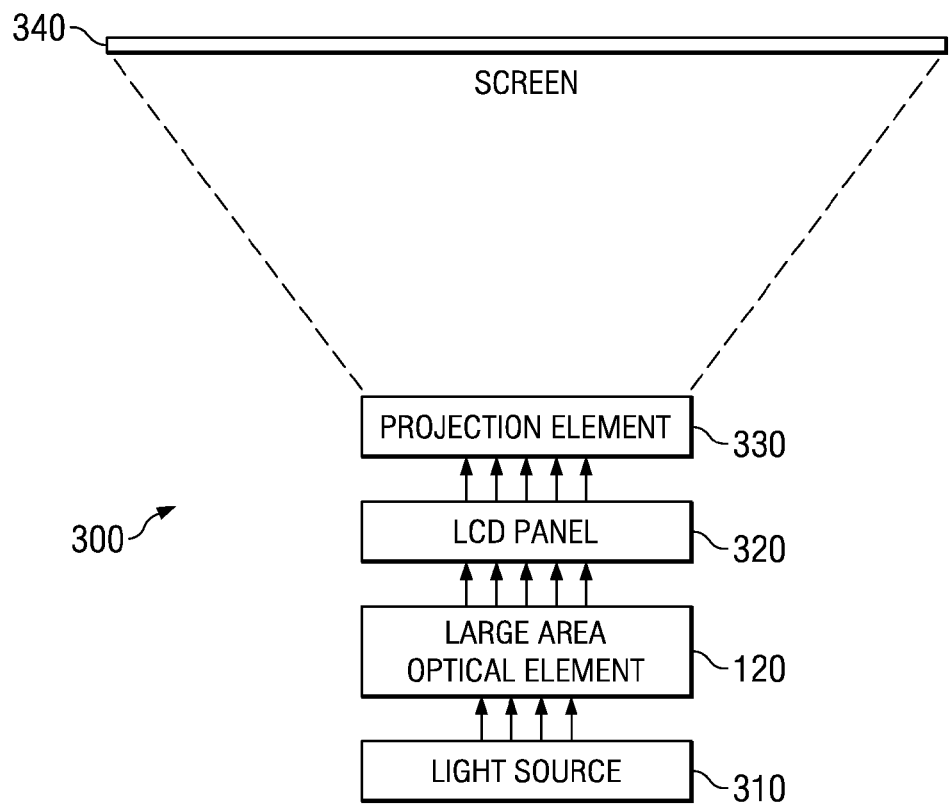
FIG. 3
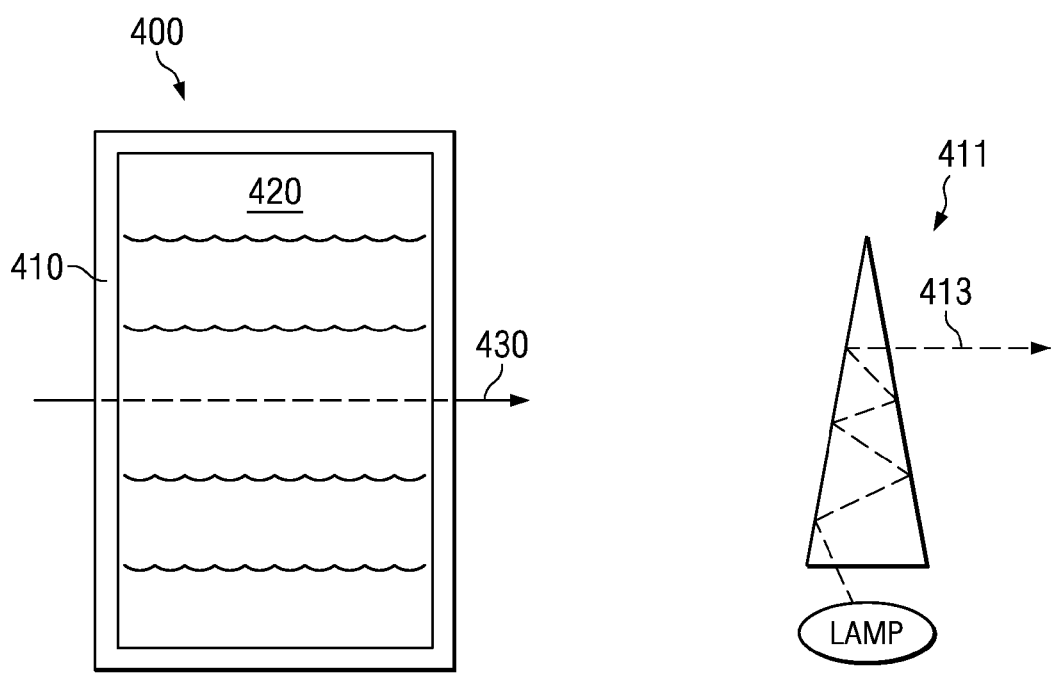
FIG. 4A
FIG. 4B

FIG. 4C
FIG. 4D
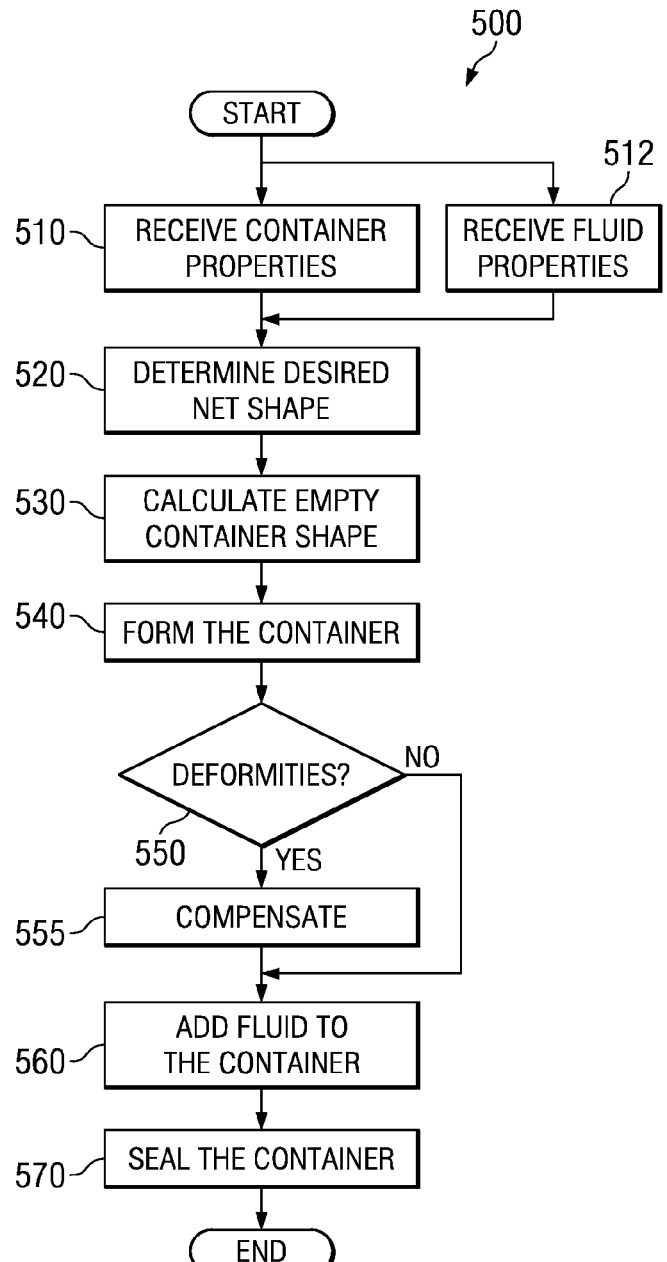
FIG. 5

LARGE-AREA OPTICAL ELEMENT

CROSS-REFERENCE TO A RELATED APPLICATION

This application claims priority under 35 USC §119(e)(1) to a provisional application entitled, "Lightweight Large Area Optical Elements," with application No. 60/773,991 that was filed Feb. 16, 2006.

DESCRIPTION OF RELATED ART

With the evolution of electronic devices, there is a continual demand for enhanced speed, capacity and efficiency in various areas, such as display systems. Generally, display systems include a light source and optical elements for directing light emitted by the light source. As display systems create images, the quality of these images may depend on the properties of these optical elements. Materials for conventional optical elements are glass, plastic, and special optical polymers. Processes used in forming plastic optical elements may include compression molding, injection molding, cell casting, and extrusion. These processes produce solid articles with a uniform material composition throughout.

As the size of an optical element increases, creating this element with desirable optical properties may become increasingly difficult. For example, molding optical elements is difficult as the size of the optical element increases. Molding errors may create defects resulting in non-optimal optical properties; this may adversely impact the quality of the displayed image. Since typical manufacturing processes for optical elements produce solid articles with a uniform material composition throughout, larger optical elements consequently have a larger weight. In fact, this increased weight may hinder these larger optical elements from being used in a host of applications. Thus, there remain unmet needs in the art.

BRIEF DESCRIPTION OF THE DRAWINGS

The invention may be better understood with reference to the following figures. The components within the figures are not necessarily to scale, emphasis instead being placed upon clearly illustrating the principles of the large-area optical element. Moreover, in the figures, like reference numerals designate corresponding parts or blocks throughout the different views.

FIG. 3 is an illustrative drawing of a second projection system that incorporates the large-area optical element.

FIGS. 4A-4D illustrate alternative embodiments for the large-area optical element.

FIG. 5 illustrates a sequence for manufacturing a large-area optical element.

Figure 1:
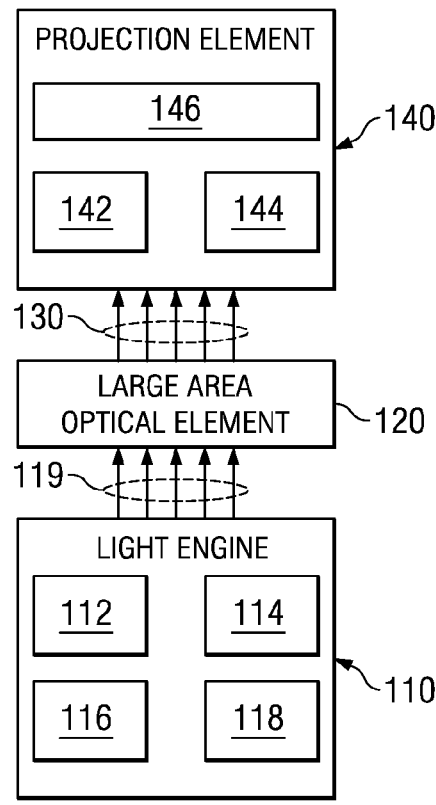
FIG. 1 is an illustrative environmental drawing that incorporates a large-area optical element.

While the large-area optical element is susceptible to various modifications and alternative forms, specific embodiments have been shown by way of example in the drawings and subsequently are described in detail. It should be understood, however, that the description herein of specific embodiments is not intended to limit the large-area optical element to the particular forms disclosed. In contrast, the intention is to cover all modifications, equivalents, and alternatives falling within the spirit and scope of the large-area optical element as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

FIG. 1 is an illustrative drawing of a display system 100. This display system includes a light engine 110. This light engine can include devices, such as a light source 112 that may be a halogen lamp, metal halide lamp, xenon lamp, laser, light emitting diode, or some other suitable light source. In addition, the light engine 110 may also include a modulator 114. The modulator 114 is any device for selectively directing at least some of the light beams it receives along a light path generally shown at reference numeral 135. For example, the modulator may be a liquid crystal display, a light emitting diode modulator, a liquid crystal on silicon display, or a digital micro-mirror device (DMD™) developed by Texas Instruments Incorporated. If this modulator is a liquid crystal panel, then it may not be included in the light engine 110, as more clearly seen with reference to FIG. 3. The light engine 110 may also include illumination optics 114 and projection optics 116, such as spherical lenses, aspherical lenses, curved or planar mirrors which may additionally have mechanism(s) for motion, either dynamic motion during the operation of the projector, or static adjustment and alignment of the projection optical system. Though not shown, the light engine 110 may include other components not shown. The relationship of the components within the light engine 110 has not been shown.

Light rays emitted from the light engine 110 are generally shown at reference numeral 119. Though these light rays are shown as generally parallel, this selection is merely for illustrative purposes and the direction that light rays emitted from the light engine 110 will travel depends upon the type of light source 112 used. For example, light rays emitted from a laser may be shown as illustrated. In contrast, light rays emitted from a lamp are not shown as generally parallel. While only one light source is shown, the display system 100 may actually include 2, 3, or some other suitable number of light sources.

The display system 100 also includes a large-area optical element ("LAOE") 120. A LAOE is generally an optical element with at least one dimension on the order of approximately 0.5 m. For example, this optical element may be a shape with a length of approximately 0.50 m, 0.53 m, or the like. In addition, the display system 100 may include 2, 3, or some other suitable number of large-area optical elements ("LAOEs"). Additional details regarding this element are described with reference to FIGS. 4A-4D.

Since the LAOE 120 is at least partially transparent, some of the light 115 that enters this element may emerge as light 130. In an alternative system, the LAOE 120 may completely transparent. As the light beams 130 emerge from the LAOE 120, they enter the projection element 140. This projection element may include various devices, such as a collimator 142, diffuser 144, and a display screen 146. For example, this projection element may include one or more turning mirrors, a Fresnel lens, a condensing lens, a projection lens, a fiber optics array, or some combination thereof.

The display screen 146 may be a relatively flat sheet of an appropriate material, or it may be of curved configuration so as to concentrate the reflected light toward a viewer, not shown. Optionally, this display screen may be translucent so as to allow for back projection. In an alternative implementation, the display screen 146 may have a reflective surface and be composed of a rigid material such as plastic, metal, and the like. The screen's surface may be a matte finish or lenticular pattern. In another alternative implementation, the display screen 146 may be composed of glass, or a translucent plastic, and may have a patterned surface so as to partially diffuse the light impinging on it from the projection element 140.

Figure 2:
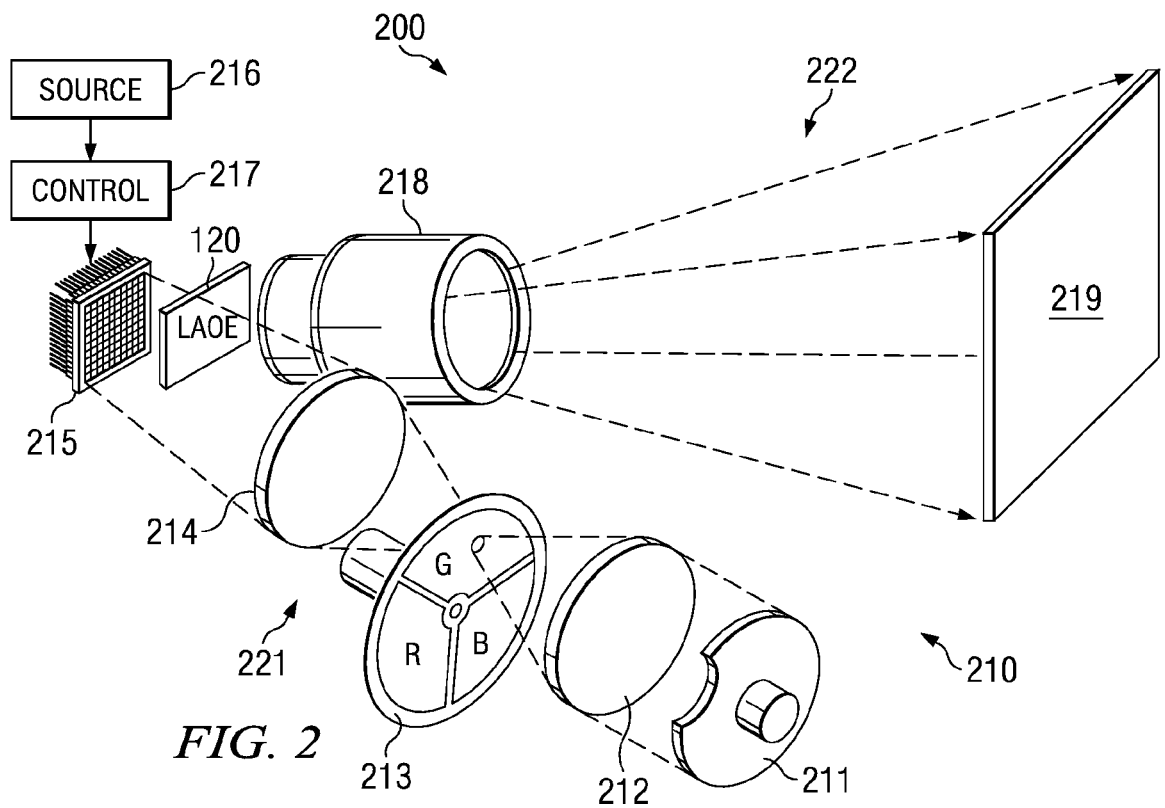
FIG. 2 is an illustrative drawing of a first projection system that incorporates the large-area optical element.

Turning now to FIG. 2, this figure is an illustrative drawing of a first projection system 200 that incorporates the LAOE 120. This projection system uses a DMD™ as the modulator. Light from a light source 211 is collimated and directed along a first portion 221 of the optical path 210. This light source may be any of the light sources described with reference to FIG. 1. A color wheel 213 selectively-colors the light from the light source 211 producing colored images. In an alternative implementation, this color wheel may be removed because the light source 211, such as a light emitting diode or a laser, may produce colored light. The condenser lenses 212, 214 shape the beam of light as it propagates along the first portion 221 of optical path 210. After emerging from the condenser lens 214, the light encounters the modulator, or DMD™ 215.

As the selectively-colored light falls on the DMD™ 215, it transforms the light into a visual image. A source 216 and corresponding control 217 may vary how this DMD™ transforms the light. The visual image created by the DMD 215 is directed to a second portion 222 of the optical path 210. In FIG. 2, the second optical path portion 222 includes the LAOE 120 subsequently described and a display screen 219, which presents a visual image to a viewer (not shown). This display screen may be any of the display screens described with reference to FIG. 1. Alternatively, the display screen 219 may be a high definition television screen. The projection lens 218 enlarges the image created by DMD™ 215 so it will fit the display screen 219.

FIG. 3 is an illustrative drawing of a second projection system 300 that incorporates the LAOE 120. This projection system uses a LCD panel as the modulator. A light source 310 emits light that enters the LAOE 120. This light source may be a cold-cathode, fluorescent lamp or any one of the light sources described with reference to FIG. 1. Though the light emitted from this light source is shown as directly entering the LAOE 120, the projection system 300 may include one or more reflecting mirrors between the light source 310 and the LAOE 120. For that implementation, light from the light source 310 may undergo a series of reflections before entering the LAOE 120. If dichroic filters are added before the reflecting mirrors, light from the light source may be separated into individual colors (e.g., red, green, and blue).

Light from the light source 310 enters the LAOE 120. Additional details regarding the LAOE 120 are described with reference to FIGS. 4A-4D. As the light emerges from the LAOE 120, it enters a liquid crystal display (LCD) panel 320. In an alternative implementation, the projection system 300 may include 2, 3, or some other suitable number of LCD panels. The LCD panel 320 spatially modulates light that it receives from the LAOE 120.

As light emerges from the LCD panel 320, the light enters a projection element 330. This projection element may include optical elements for both collecting the light from the LCD panel 320 and optical elements for focusing this light onto an image plane, or display screen 340. For example, this projection element may include one or more turning mirrors, a Fresnel lens, a condensing lens, a projection lens, a fiber optics array, or some combination thereof. The display screen 340 may be any of the display screens described with reference to FIG. 1.

Turning now to FIGS. 4A-4D, these figures illustrate alternative embodiments for the LAOE 120. FIG. 4A is a side view of a LAOE 400 that includes a container 410 that may be formed using glass, poly(methylmethacrylate) PMMA), polycarbonate, polystyrene, or some other suitable material that is substantially transparent to visible light. The shape and thickness of the container 410 may vary as described with reference to the remaining figures. Some examples for the shape of the container 410 are shown in FIGS. 4B-4C. FIG. 4B illustrates an LAOE 411 with a wedge-shaped container. FIG. 4C illustrates an LAOE 412 with a bottle-shaped container. As indicated by arrows 413, 414, light enters these LAOEs may undergo total internal reflection before emission. In an alternative implementation, light may undergo partial internal reflection before transmission. Returning to FIG. 4A, one or more of the surfaces of the container 410 may be transparent such that light may flow through the LAOE 420 as indicated by the arrow 430. Thus, the container 410 may include numerous optical surfaces that facilitate light passage. In addition, one or more of the surfaces of the container 410 may include an antireflection coating (e.g., low-index fluorocarbon coating, multilayer broadband coating, and the like). Examples of low-index coatings may include Teflon™ AF, sol-gel coating, and the like. Examples of multilayer broadband coatings may include multilayer coatings comprising $SiO_2$, $TiO_2$, $MgF_2$, and the like.

One may select the type of fluid for the liquid 420 using a host of design objectives. This liquid may be selected such that it has a density substantially less than the container's density. With this selection, the optical element 400 weighs less than a solid optical element made from the same material. In other words, the liquid 420 may have a density less than the density of glass or PMMA when the container 410 is formed of glass or PMMA, respectively. In addition, the liquid 420 may be selected such that it has an index of refraction, or liquid index of refraction, that is approximately equal to the index of refraction of the container 410, or container index of refraction. As an example, the container 410 may be made of PMMA, which has a density of 1.2 g/cm$^3$ and an index of refraction of 1.49. In this example, the liquid may be decahydronaphthalene CAS 91-17-8, which has a density of 0.9 g/cm and an index of refraction of 1.48. While decahydronaphthalene is used in this example, alternative implementations may result from using the cis-isomer, the trans-isomer, or a mixture of the cis-isomer and the trans-isomer of decahydronaphthalene. Other fluids that may be used as the liquid 420 may include stable aqueous solutions of organic compounds (e.g., high fructose corn syrup) and liquids, or solutions, that have indices of refraction closely matched to the container index of refraction. For example, the liquid index of refraction and container index of refraction may differ by less than 0.02, 0.01, 0.005, or the like. Liquids with these indices of refraction may be obtained from Cargille Laboratories in Cedar Grove, N.J. In an alternative embodiment, the liquid 420 may have an index of refraction in the range of approximately 1.46 to approximately 1.52. While a substantial portion of the container 410 includes the liquid 420, an alternative implementation may exist where a 33%, 50%, or some other suitable percentage of the container's volume may include the liquid 420.

Turning now to FIG. 4D, this figure illustrates a LAOE 440 that includes an insert 445. While the insert 445 is shown as a v-shaped insert, the shape of this insert may be u-shaped, w-shaped, or some other suitable shape. Adding an insert to the LAOE 440 and choosing the shape of that insert may be based on desired optical properties. Making selections based on optical properties is described in additional detail with regard to FIG. 5. The LAOE 440 or any of the LAOEs described with reference to FIGS. 4A-4C may be a projection light guide or a transparent waveguide. If the LAOE is a transparent waveguide, it will have an index of refraction associated with the waveguide's container, or waveguide index of refraction.

FIG. 5 illustrates a sequence 500 for manufacturing a LAOE, such as any of the previously described LAOEs. Any process descriptions or blocks in flow charts may be understood as representing modules, or segments, which may include one or more executable instructions for implementing specific logical functions or blocks in the process. Alternative implementations are included within the scope of the LAOE in which functions may be executed out of order from that shown or discussed, including substantially concurrently or in reverse order, depending on the functionality involved. Moreover, either the sequence 500, or portion of it, may be completed by hardware, software, an operator, a machine-operated device, or some combination.

At block 510, material properties of a container, such as one previously described, for the large-area optical element (LAOE) are received. These material properties may include optimal dimensions for the LAOE. For example, it may be optimal to have a LAOE with an area of approximately 0.5 m, 0.8 m, or some other suitable large area. In addition, this block may include receiving the type of material that will be used in forming the container, as well as the density, index of refraction, malleability, and other relevant container material properties for that material. In an alternative implementation, this block may include only receiving the name of the material. For this implementation, the sequence 500 may include another block where the properties associated with the named container material may be retrieved from a designated location (e.g., memory).

At block 512, the material properties for a fluid, or fluid material, are received. This block may include receiving the name of the fluid. In addition, this block may include receiving the fluid's density, index of refraction, expansion property, or other relevant fluid material properties. In an alternative implementation, this block may include only receiving the name of the material. For this implementation, the sequence 500 may include another block where the properties associated with the named fluid material may be retrieved from a designated location (e.g., memory). Though block 510 and block 512 are shown as occurring essentially simultaneously, numerous alternative implementations may occur by combining these blocks, implementing them sequentially, or the like.

Block 520 follows blocks 510, 512. In block 520, a desired net shape for the LAOE is determined. In other words, this block may determine a shape in light of system parameters (e.g., distance to a modulator, available system dimensions, and the like) and the material properties for both the fluid and the container. In an alternative implementation, this block may receive input from a user. For that arrangement, the determination may involve a shape selection given the received fluid material properties, the container material properties, and the system properties.

Block 520 is followed by block 530. In this block, the shape of an empty container for use in the LAOE is calculated. This calculation includes assessing whether the calculated empty container produces the desired net shape when filled with the fluid material. For example, this calculation may involve considering the expansion properties of the fluid material and the malleability of the container material. Once the relevant properties are considered, the dimensions for an empty container may be calculated, such that addition of the fluid material produces the desired net shape. This calculation may be done by Finite Element Analysis using software available from such companies as AbaQus, Ansys, and the like.

Block 530 is followed by block 540. In this block, the container within the LAOE is formed. This container may be formed from individual pieces of the container material fused together. In an alternative implementation, this container may be monolithic. In either implementation, the container may be fabricated from sheets of the container material that are attached to one another. For example, the container may be fabricated from sheets of glass or PMMA that have been attached using an adhesive, heat sealant, or the like. This block may also include forming the container such that there are optical facets for producing desired optical affects. For example, an antireflection coating may be attached to one optical facet for decreasing optical aberrations associated with light reflection. This optical facet may be an external surface of the container. This block may include forming an opening, or filling port, for adding the liquid.

Block 540 is followed by the decision block 550. In this block, it is determined whether deformities exist in the empty container formed in block 540. If deformities exist, the "yes" branch is followed from block 550 to block 555. In this block, there is a compensation done to account for the deformities. This compensation may include altering the type of fluid material, amount of fluid material, adding an insert, or some other suitable compensatory act.

Block 560 follows block 555 and block 550 when there are no deformities. In block 560, the fluid material is added to the empty container. This adding may be completed using pouring, manual pump injection, automatic pump injection, or some other suitable fluid handling technique. This block may be done in a vacuum. In this block, some portion of the container or the entire empty container may be filled with the fluid material. For example, the fluid may fill eighty percent of the container.

Block 560 is followed by block 570. In this block, the container is sealed, such that the desired net shape determined in block 520 is produced. To seal the container, the filling port may be permanently sealed, which may be done by solder sealing, flame sealing, epoxy sealing, or some other permanent attachment technique. Alternatively, the container may be sealed by adding a secure, but non permanent, lid to the filling port. For example, this lid may be a septum, a screw cap, a crimp cap, or the like.

While various embodiments of the LAOE have been described, it may be apparent to those of ordinary skill in the art that many more embodiments and implementations are possible that are within the scope of this system. Although certain aspects of the LAOE may be described in relation to specific techniques or structures, the teachings and principles of the present element are not limited solely to such examples. All such modifications are intended to be included within the scope of this disclosure and the present LAOE and protected by the following claim(s).

The invention claimed is:

1. A display system, comprising:
   a light source;
   a spatial light modulator configured to modulate light from the light source;
   an optical element having a dimension on the order of approximately 0.5 m positioned to at least partially receive and transmit light modulated by the spatial light modulator; and a projection element for projecting light modulated by the spatial light modulator and transmitted by the optical element onto a display surface for presenting a visual image to a viewer;

wherein the optical element comprises:

a monolithic container fabricated from a transparent material, wherein the monolithic container has a plurality of optical surfaces including an entrance face, a first face, and a second face opposing the first face, the faces shaped and positioned such that light entering the container through the entrance face may be reflected by both the first and second faces before passing through the first or second face; and a liquid positioned and sealed within the monolithic container, wherein the liquid has a density substantially less than a density of the monolithic container and wherein the liquid has an index of refraction that is approximately equal to the index of refraction of the container.

2. The system of claim 1, wherein the transparent material is a material selected from the group consisting of glass and poly(methylmethacrylate).

3. The system of claim 2, wherein the container is fabricated with sheets of the transparent material.

4. The system of claim 3, wherein the liquid is selected from the group consisting of cyclic hydrocarbon and an index matching fluid.

5. The system of claim 4, wherein at least one face of the container has an external coated with an anti-reflection coating.

6. The system of claim 1, wherein the index of refraction of the liquid is approximately 1.5.

7. The system of claim 1, further comprising an insert within the liquid for redirecting received light.

8. The system of claim 6, wherein the insert is V-shaped.

* * * * *